US011173970B2

(12) United States Patent
Otterstrom

(10) Patent No.: US 11,173,970 B2
(45) Date of Patent: Nov. 16, 2021

(54) AERODYNAMIC TRACTOR-TRAILER

(71) Applicant: GEMINI DYNAMICS L.L.C., Lindon, UT (US)

(72) Inventor: Gary G. Otterstrom, Lindon, UT (US)

(73) Assignee: PYRO DYNAMICS, LLC, Lindon, UT (US)

(*) Notice: Subject to any disclaimer, the term of this patent is extended or adjusted under 35 U.S.C. 154(b) by 15 days.

(21) Appl. No.: 16/515,839

(22) Filed: Jul. 18, 2019

(65) Prior Publication Data

US 2020/0023911 A1 Jan. 23, 2020

Related U.S. Application Data

(60) Provisional application No. 62/700,161, filed on Jul. 18, 2018.

(51) Int. Cl.
| | |
|---|---|
| *B62D 35/00* | (2006.01) |
| *B62D 35/02* | (2006.01) |
| *B62D 53/00* | (2006.01) |
| *B60K 8/00* | (2006.01) |
| *B60L 1/00* | (2006.01) |
| *B60K 7/00* | (2006.01) |
| *B60L 50/15* | (2019.01) |

(52) U.S. Cl.
CPC .......... *B62D 35/001* (2013.01); *B60K 7/0007* (2013.01); *B60K 8/00* (2013.01); *B60L 1/20* (2013.01); *B62D 35/007* (2013.01); *B62D 35/02* (2013.01); *B62D 53/00* (2013.01); *B60L 50/15* (2019.02); *B60L 2200/36* (2013.01)

(58) Field of Classification Search
CPC ....... B60L 1/20; B60K 7/0007; B62D 35/001; B62D 35/02
See application file for complete search history.

(56) References Cited

U.S. PATENT DOCUMENTS

| | | | | |
|---|---|---|---|---|
| 5,348,366 | A * | 9/1994 | Baker | B62D 35/001 296/180.4 |
| 6,877,793 | B2 * | 4/2005 | Cory | B62D 35/001 296/180.1 |
| 7,401,578 | B2 | 7/2008 | Otterstrom et al. | |
| 7,654,354 | B1 | 2/2010 | Otterstrom | |
| 7,690,333 | B2 | 4/2010 | Otterstrom et al. | |
| 7,926,605 | B1 | 4/2011 | Otterstrom | |
| 7,992,666 | B2 * | 8/2011 | Otterstrom | B62D 35/001 180/69.6 |
| 8,082,889 | B2 | 12/2011 | Otterstrom et al. | |
| 8,267,211 | B2 | 9/2012 | Otterstrom | |
| 8,627,913 | B1 | 1/2014 | Otterstrom | |

* cited by examiner

*Primary Examiner* — John D Walters
*Assistant Examiner* — James J Triggs
(74) *Attorney, Agent, or Firm* — Kunzler Bean & Adamson; Bruce R. Needham

(57) ABSTRACT

A tractor-trailer is disclosed, with associated apparatuses. A tractor may include a tractor air duct disposed underneath a cab. The tractor air duct may extend between a front opening at a front of the tractor and a rear opening at a rear of the tractor. A trailer may include a duct system that receives airflow from the rear opening of the tractor air duct and directs the airflow to a location behind a cargo compartment. An air distributor may be disposed behind the cargo compartment. An air distributor may include a fairing with openings, so that airflow from the duct system enters a space between the cargo compartment and the fairing, and exits the openings behind the trailer.

20 Claims, 6 Drawing Sheets

AERODYNAMIC TRACTOR-TRAILER

CROSS-REFERENCES TO RELATED APPLICATIONS

This application claims the benefit of U.S. Provisional Patent Application No. 62/700,161 entitled "AERODYNAMIC TRACTOR-TRAILER" and filed on Jul. 18, 2018 for Gary G. Otterstrom, which is incorporated herein by reference.

FIELD

The subject matter disclosed herein relates to aerodynamic vehicles and more particularly relates to an aerodynamic tractor-trailer.

BACKGROUND

Aerodynamic drag may significantly reduce the fuel efficiency of a truck, such as a tractor-trailer. Air may be compressed by the front of the moving truck, flow around the tractor-trailer with a turbulent boundary layer, and experience further turbulence in a low-pressure wake region behind the back of the truck. The effects of front compression, surface friction, and rear drag may become more pronounced at higher speeds. At highway speeds, more of the engine's power may go to overcoming aerodynamic drag than to overcoming the rolling resistance of the tires. Accordingly, reducing drag may significantly increase the performance and fuel efficiency of a tractor-trailer.

SUMMARY

A tractor-trailer is disclosed, with associated apparatuses. In some embodiments, a tractor-trailer includes a tractor and a trailer. A tractor, in one embodiment, includes a tractor air duct disposed underneath a cab. In a further embodiment, the tractor air duct extends between a front opening at a front of the tractor and a rear opening at a rear of the tractor. A trailer, in one embodiment, includes a duct system that receives airflow from the rear opening of the tractor air duct and directs the airflow to a location behind a cargo compartment. In some embodiments, the trailer includes an air distributor disposed behind the cargo compartment. In a further embodiment, the air distributor includes a fairing with openings, so that airflow from the duct system enters a space between the cargo compartment and the fairing, and exits the openings behind the trailer.

In some embodiments, the duct system includes a lower trailer air duct disposed underneath the cargo compartment. In further embodiments, the lower trailer air duct may be positioned to receive airflow from the rear opening of the tractor air duct. In some embodiments, the duct system includes one or more auxiliary trailer air ducts disposed at a first side of the cargo compartment, a second side of the cargo compartment, and/or a top of the cargo compartment. In some embodiments, the duct system includes one or more blind ducts disposed within the lower trailer air duct. In further embodiments, the one or more blind ducts may be positioned to redirect a portion of airflow within the lower trailer air duct to the one or more auxiliary trailer air ducts.

In one embodiment the openings of the fairing include a set of vertical openings disposed across a back of the fairing. In some embodiment, a rear edge of the tractor air duct conforms to an arc with a radius extending to a pivot point where the trailer is coupled to the tractor. In some embodiments, the front opening of the tractor air duct is larger than the rear opening of the tractor air duct.

In some embodiments, an internal surface of the tractor air duct and/or the duct system is dimpled. In some embodiments, an external surface of the tractor and/or the trailer is dimpled. In some embodiments, the air distributor is movable to access rear doors of the cargo compartment. In some embodiments, the trailer includes one or more air directing blades disposed at the rear of the cargo compartment. In some embodiments, an air duct of the duct system includes a flexible lower surface and/or a retractable lower surface. In some embodiments, wheels of the tractor and the trailer are in an in-line configuration.

In some embodiments, the tractor includes two engines positioned on opposite sides of the tractor air duct. In a further embodiment, the tractor includes generators coupled to the two engines. In one embodiment, wheels of the tractor and/or the trailer include wheel hub motors powered by the generators. In some embodiments, the tractor includes co-generation units coupled to the two engines that generate electricity using waste heat from the engines. In some embodiments, the tractor includes ultracapacitors and storage batteries coupled to the generators. In some embodiments, the wheel hub motors provide regenerative braking to generate electricity during deceleration.

An apparatus, in one embodiment, includes an air distributor that include a fairing with openings. In some embodiments, the fairing is shaped to form a space between a cargo compartment of a trailer and the fairing when the fairing is coupled to the trailer behind the cargo compartment. In some embodiments, the openings are shaped to permit airflow entering the space from a duct system in the trailer to exit the openings behind the trailer.

In some embodiments, the openings of the fairing include a set of vertical openings disposed across a back of the fairing. In some embodiments, the air distributor is movable to access rear doors of the cargo compartment.

In some embodiments, the apparatus includes a tractor and a trailer. A tractor, in one embodiment, includes a tractor air duct disposed underneath a cab. In a further embodiment, the tractor air duct extends between a front opening at a front of the tractor and a rear opening at a rear of the tractor. A trailer, in one embodiment, includes the duct system. In a further embodiment, the duct system receives airflow from the rear opening of the tractor air duct and directs the airflow to the space between the cargo compartment and the fairing.

In some embodiments, the duct system includes a lower trailer air duct disposed underneath the cargo compartment. In further embodiments, the lower trailer air duct is positioned to receive airflow from the rear opening of the tractor air duct. In some embodiments, the duct system includes one or more auxiliary trailer air ducts disposed at a first side of the cargo compartment, a second side of the cargo compartment, and/or a top of the cargo compartment. In some embodiments, the duct system includes one or more blind ducts disposed within the lower trailer air duct. In further embodiments, the one or more blind ducts are positioned to redirect a portion of airflow within the lower trailer air duct to the one or more auxiliary trailer air ducts.

An apparatus, in another embodiment, includes a trailer. In one embodiment, the trailer includes a duct system for receiving airflow from in front of the trailer and directing the airflow to a location behind a cargo compartment of the trailer. In some embodiments, the duct system includes a lower trailer air duct disposed underneath the cargo compartment. In further embodiments, the lower trailer air duct is positioned to receive the airflow. In some embodiments, the duct system includes one or more auxiliary trailer air ducts disposed at a first side of the cargo compartment, a second side of the cargo compartment, and/or a top of the cargo compartment. In some embodiments, the duct system includes one or more blind ducts disposed within the lower trailer air duct. In further embodiments, the one or more blind ducts are positioned to redirect a portion of airflow within the lower trailer air duct to the one or more auxiliary trailer air ducts.

In some embodiments, the apparatus includes a tractor. In one embodiment, the tractor includes a tractor air duct disposed underneath a cab. In a further embodiment, the tractor air duct extends between a front opening at a front of the tractor and a rear opening at a rear of the tractor. In some embodiments the duct system of the trailer receives airflow from the rear opening of the tractor air duct. In some embodiments, the apparatus includes an air distributor disposed behind the cargo compartment of the trailer. In a further embodiment, the air distributor includes a fairing with openings, so that airflow from the duct system enters a space between the cargo compartment and the fairing, and exits the openings behind the trailer.

BRIEF DESCRIPTION OF THE DRAWINGS

In order that the advantages of the embodiments of the invention will be readily understood, a more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
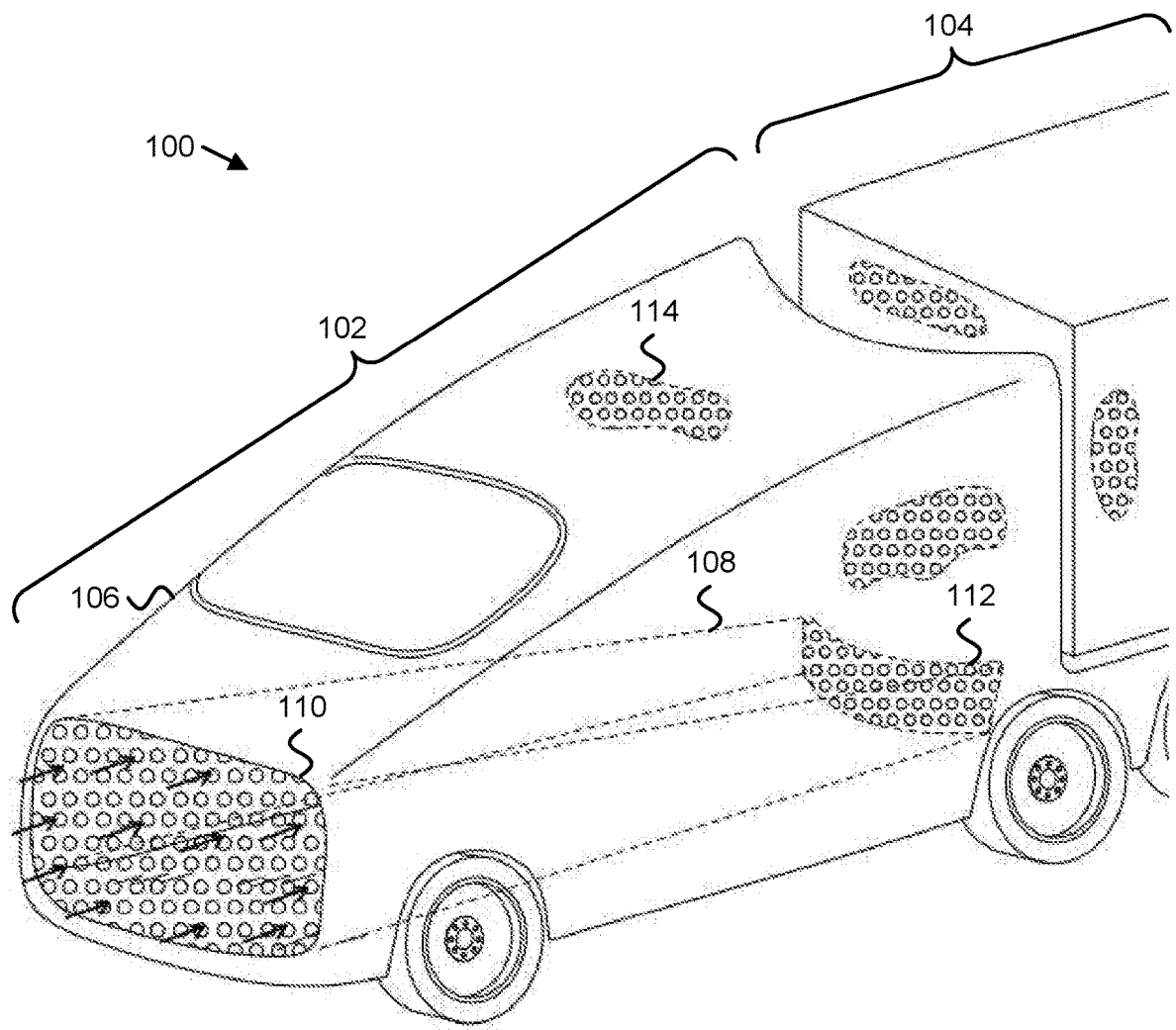
FIG. 1 is a front perspective view illustrating one embodiment of a tractor-trailer.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, structures, or characteristics of the invention may be combined in any suitable manner in one or more embodiments. In the following description, numerous specific details are included to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one and only one of any single item in the list. For example, "one of A, B and C" includes only A, only B or only C and excludes combinations of A, B and C. As used herein, "a member selected from the group consisting of A, B, and C," includes one and only one of A, B, or C, and excludes combinations of A, B, and C." As used herein, "a member selected from the group consisting of A, B, and C and combinations thereof" includes only A, only B, only C, a combination of A and B, a combination of B and C, a combination of A and C or a combination of A, B and C.

FIG. 1 depicts one embodiment of a tractor-trailer 100, in a front perspective view. In the depicted embodiment, the tractor-trailer 100 includes a tractor 102, and a trailer 104. In general, in various embodiments, a tractor 102 may include an engine, drive wheels, steering wheels, a cab 106 for an operator, a hitch such as a fifth wheel hitch for coupling the tractor 102 to a trailer 104, and the like. In further embodiments, a trailer 104 may include a cargo compartment, rear wheels (for a semitrailer), front and rear wheels (for a full trailer), support legs for parking, a kingpin that couples to a fifth wheel hitch, and the like. Various types of tractor 102 and/or trailer 104 may be suitable for use in an aerodynamic tractor-trailer 100. In one embodiment, the tractor 102 and the trailer 104 may be detachably coupled, in the manner of a conventional tractor-trailer. In another embodiment, the tractor 102 and the trailer 104 may be permanently coupled as an articulated or non-articulated truck, or other vehicle, where a front portion including an engine and cab 106 may be regarded as the tractor 102, and a cargo compartment may be regarded as the trailer 104.

In certain embodiments, the tractor 102 includes a tractor air duct 108 disposed underneath the cab 106. In various embodiments, a duct such as the tractor air duct 108, or other ducts in a duct system for the trailer 104, may include any channel for conveying airflow. Ducts may be formed of metal, plastic, reinforced fabric, composite, or other materials, and may have various shapes and cross sections. In certain embodiments, duct walls that enclose the airflow within a duct may be formed as part of the duct alone or may be shared with another component. For example, the floor of a cargo compartment for the trailer 104 may also be an upper wall for a duct underneath the cargo compartment.

In certain embodiments, the tractor air duct 108 may extend between a front opening 110 at the front of the tractor 102 and a rear opening 112 at a rear of the tractor 102. In various embodiments, as the tractor-trailer 100 is driven, air may flow through the tractor air duct 108, into a duct system of the trailer 104, and out an air distributor behind the trailer 104, thus reducing drag due to front air compression, boundary layer turbulence, and/or wake turbulence. When a large truck without a tractor air duct 108, a trailer duct system, or an air distributor is driven, 50-60% of the power output of the engine may be expended to overcome aerodynamic drag. Thus, in various embodiments, providing a tractor-trailer 100 with a tractor air duct 108, a trailer duct system, and a rear air distributor may significantly increase fuel efficiency by decreasing drag.

In one embodiment, the front opening 110 of the tractor air duct 108 is larger than the rear opening 112 of the tractor air duct 108. In a further embodiment, the tractor air duct 108 may narrow from front to back as it connects the front opening 110 and the rear opening 112. Air entering the duct may be compressed by the narrowing duct. In one embodiment, the area of the rear opening 112 may be half the area of the front opening 110, providing a two-to-one compression ratio. In another embodiment the area ratio between the front opening 110 and the rear opening 112 may provide a compression ratio other than a two-to-one compression ratio. In certain embodiments, compression may be a source of drag. For example, the front of a conventional tractor-trailer may compress air as it moves forward, and the compressed air may then flow turbulently past the sides of the truck. Energy is expended in compressing the air, and in the turbulent flow. By contrast, in some embodiments, compressing airflow within an air duct that narrows from a front opening 110 to a rear opening 112 may provide a greater proportion of laminar flow, thus reducing the amount of energy that is expended in turbulent flow.

However, inclement weather may negatively affect the performance of the tractor air duct 108. For example, snow may clog or partially obstruct the tractor air duct 108, increasing drag. In certain embodiments, a radiator for hot engine coolant may be disposed in the tractor air duct 108 so that snow is melted by engine heat. Similarly, in some embodiments, one or more ports for engine exhaust may be disposed in the tractor air duct 108 to melt snow. Additionally, in some embodiments, the front opening 110 may be blockable. For example, a door or cover may be provided to cover the front opening 110 in certain weather conditions. Covering the front opening 110 may result in drag comparable to a conventional tractor-trailer, with no airflow through the tractor air duct 108, but may reduce drag compared to a tractor-trailer 100 with a clogged or occluded tractor air duct 108.

In one embodiment, an external surface of the tractor 102 and/or the trailer 104 may be, or may include, a dimpled surface 114. Similarly, in a certain embodiment, an internal surface of the tractor air duct 108 and/or a trailer duct system may be, or may include, a dimpled surface 114. Dimpling is depicted in small regions in FIG. 1, so as not to obscure other features of the tractor-trailer 100, but may extend across larger surfaces or regions of the tractor 102, the trailer 104, the tractor air duct 108 and or ducts of a trailer duct system. A dimpled surface 114 may be provided by molding plastic surfaces, stamping or rolling sheet metal surfaces, or the like, prior to installing components on the tractor-trailer 100. In one embodiment dimples of a dimpled surface 114 may be comparable in size to dimples on a dimpled surface of a golf ball. In another embodiment, dimples may be smaller or larger. As in golf balls, dimples of a dimpled surface 114 for a tractor-trailer 100 may reduce overall turbulence and drag by forming a thin turbulent boundary layer where airflow contacts a surface, and allowing a greater proportion of laminar airflow further from the surface.

Figure 2:
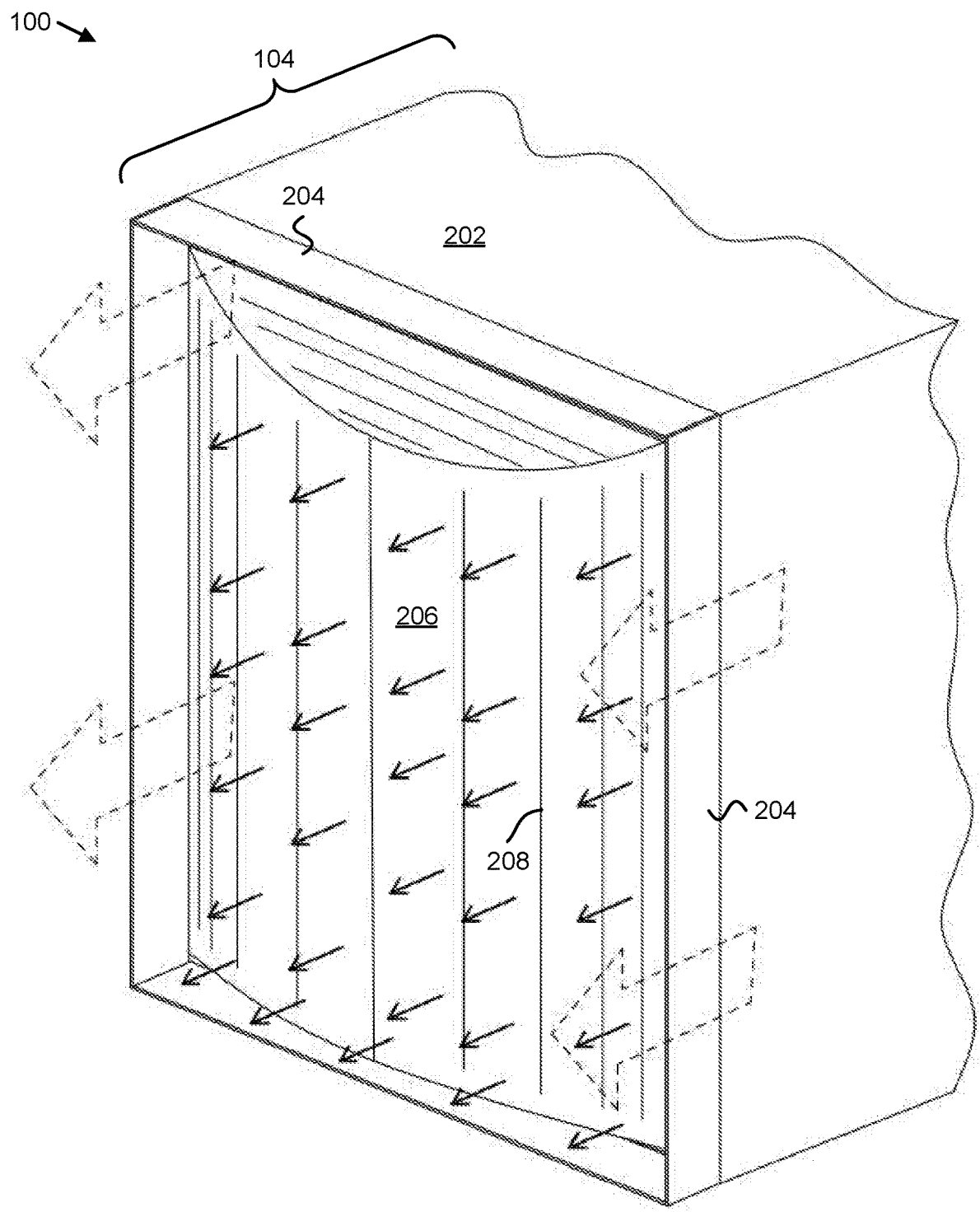
FIG. 2 is a rear perspective view illustrating a further embodiment of a tractor-trailer.

FIG. 2 depicts one embodiment of a tractor-trailer 100, in a rear perspective view. The tractor-trailer 100 of FIG. 2 may be substantially as described above with reference to FIG. 1. In the depicted embodiment, the trailer 104 includes a cargo compartment 202, an air distributor 206, and one or more air directing blades 204.

The cargo compartment 202, in various embodiments, may include any space for transporting cargo. In the depicted embodiment, the trailer 104 is a box trailer, and the cargo compartment 202 is rectangular. In another embodiment, a cargo compartment 202 may include a flat bed with a removable cover and/or curtain sides, a removable intermodal container, a tank for liquid cargo, or the like. Various types of trailers 104 and/or cargo compartments 202 suitable for use with the tractor-trailer 100 will be clear in view of this disclosure.

In various embodiments, a duct system described in further detail below receives airflow from the rear opening 112 of the tractor air duct 108 and directs the airflow to a location behind the cargo compartment 202. For example, in various embodiments, ducts may be disposed above, below, or to the sides of the cargo compartment 202, or built into the floor, walls, and/or ceiling of the trailer 104, and may have one or more openings at the back of the trailer 104, behind the cargo compartment 202.

The air distributor 206, in certain embodiments, is disposed behind the cargo compartment 202. In various embodiments, the air distributor 206 may include a fairing with openings 208. In further embodiments, airflow from the duct system may enter a space between the cargo compartment 202 and the air distributor 206 fairing, and may exit the openings 208 behind the trailer 104. In general, in various embodiments, air may be received and compressed by the tractor air duct 108, transmitted to the rear of the tractor-trailer 100 by the duct system of the trailer 104, and released via the openings 208. In FIG. 2, solid arrows depict airflow exiting the openings 208 of the air distributor 206, and dashed arrows depict airflow around the outside of the trailer 104.

In a conventional tractor-trailer without ducts as disclosed herein, a high-pressure area may develop where the front of the moving truck compresses air, and a corresponding low pressure area may develop behind the truck. Where air flowing around the truck encounters the low-pressure area at the back of the truck, large turbulent vortices may develop, contributing substantially to drag. By contrast, in the depicted embodiment, receiving air via the tractor air duct 108 may decrease pressure at the front of the tractor-trailer 100, and allowing the air to exit via openings 208 of an air distributor 206 may increase pressure at the back of the trailer 104, reducing turbulent recombination of the airflow past the sides with air at the back. Additionally, the velocity of the air flowing out the openings 208 (e.g., due to compression of the air in the tractor air duct 108 or within the duct system of the trailer 104) may provide a "tail" of laminar airflow behind the trailer 104, so that airflow along the outside of the trailer 104 recombines non-turbulently with airflow in the "tail."

The fairing of the air distributor 206, in various embodiments, may comprise any aerodynamic structure external to the cargo compartment 202. In further embodiments, the fairing may include various materials such as flexible material (e.g., fabric, vinyl) with stiffener ribs, solid material (e.g., hard plastic), or the like. In certain embodiments, the air distributor 206 may be movable to access rear doors of the cargo compartment 202. For example, a fairing for a trailer 104 with rear doors may be split down the middle, so that each half of the fairing may be rolled, folded, swung, or otherwise moved away from the doors for access. In another embodiment, however, a fairing for an air distributor 206 may be permanently or semi-permanently installed at the rear of a trailer 104 such as a tank trailer, a hopper trailer, a trailer with side access doors, or the like. In the depicted embodiment, the fairing includes curved left and right portions that extend from the sides of the trailer 104 and meet in the middle, forming a space behind the cargo compartment 202 to receive airflow from the trailer duct system. Additionally, in the depicted embodiment, the fairing includes upper and lower portions that extend from the top and bottom of the trailer 104, so that air exits via the openings 208 (rather than via large gaps at the top and bottom).

In the depicted embodiment, the openings 208 of the air distributor 206 fairing include a set of vertical openings disposed across the back of the fairing. A vertical opening may refer to a slit, an oval and/or another shape of opening that extends further in a vertical direction (e.g., between the top and bottom of the trailer 104) than in non-vertical direction. Vertical openings, in certain embodiments, may facilitate the formation of a "tail" of laminar airflow behind the trailer 104. In another embodiment, however, openings 208 may be horizontal or diagonal, or may be in a non-linear shape such as a circle, a rectangle, a squiggle, or the like. In certain embodiments, the openings 208 may include vertical and non-vertical openings. For example, in the depicted embodiment, the openings 208 include vertical openings disposed across the back of the fairing, and additional horizontal openings in the top and bottom portions of the fairing.

One or more air directing blades 204, in various embodiments, may be disposed at the rear of the cargo compartment 202. For example, air directing blades 204 may be disposed above, below, and/or to the sides of the air distributor 206. In various embodiments, an air directing blade 204 may refer to a broad and/or substantially flat surface for directing air. In certain embodiments, air directing blades 204 may be flat, airfoil-shaped or the like, and a rear edge of an air directing blade 204 may be flat, tapered, rounded, or the like. Various configurations of air directing blades 204 will be clear in view of this disclosure. In certain embodiments, an air directing blade 204 may create a sharp break between the airflow around a trailer 104 and the airflow behind a trailer 104, reducing turbulence. For example, in a conventional tractor-trailer without ducts, an air distributor 206, and/or air directing blades 204, airflow around the truck may recombine turbulently with low-pressure air behind the truck at a right-angle rear corner of the truck. Conversely, with an air distributor 206 and air directing blades 204, airflow around the truck may flow past one side of an air directing blade 204 while airflow exiting the air distributor 206 flows past the other side of an air directing blade 204, so that air flowing the same direction on both sides of the air directing blade 204 recombines non-turbulently behind the air directing blade 204.

Figure 3:
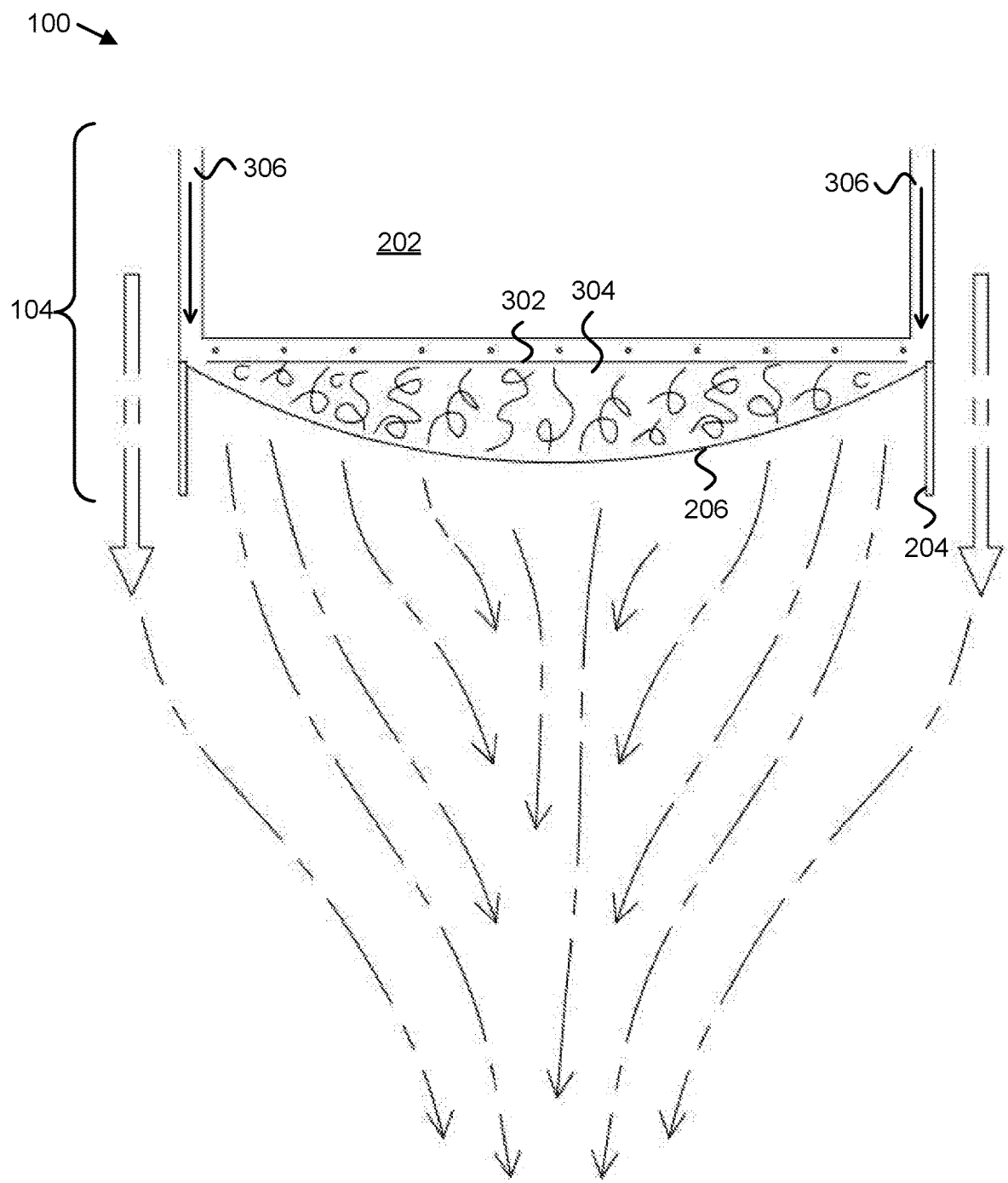
FIG. 3 is a cross section view illustrating a further embodiment of a tractor-trailer.

FIG. 3 depicts one embodiment of a tractor-trailer 100, in a top cross-section view. The tractor-trailer 100 of FIG. 3 may be substantially as described above with reference to FIGS. 1 and 2. In the depicted embodiment, the duct system of the trailer 104, which communicates airflow from the tractor air duct 108 to the air distributor 206, includes auxiliary trailer air ducts 306 within the walls of the trailer 104. Airflow within the auxiliary trailer air ducts 306 enters a space 304 between the cargo compartment 202 and the air distributor 206. In various embodiments, air may flow turbulently within the space 304 between the cargo compartment 202 and the air distributor 206, without causing airflow behind the air distributor 206 to be turbulent. Additionally, in the depicted embodiment, the duct system of the trailer 104 includes a lower trailer air duct disposed underneath the cargo compartment 202. In a further embodiment, the trailer 104 includes a scoop 302 or other air-directing component, which directs at least a portion of the airflow (represented as dots in FIG. 3, or arrows exiting the page) from the lower trailer air duct into the space 304 between the cargo compartment 202 and the air distributor 206. The scoop 302 may be a curved panel, an airfoil, a flat blade, or the like, and may be formed from metal, plastic, composite material, or the like.

As depicted in FIG. 3, air exiting the air distributor 206 may form a "tail" behind the trailer 104, similar in shape to the "tail" of a teardrop. Airflow around the outside of the trailer 104 recombines with the air exiting the air distributor 206 behind the air directing blades 204. Thus, in certain embodiments, laminar rather than turbulent airflow behind the trailer 104 may significantly reduce drag, and increase the fuel efficiency (or other energy efficiency) of the tractor-trailer 100.

Figure 4:
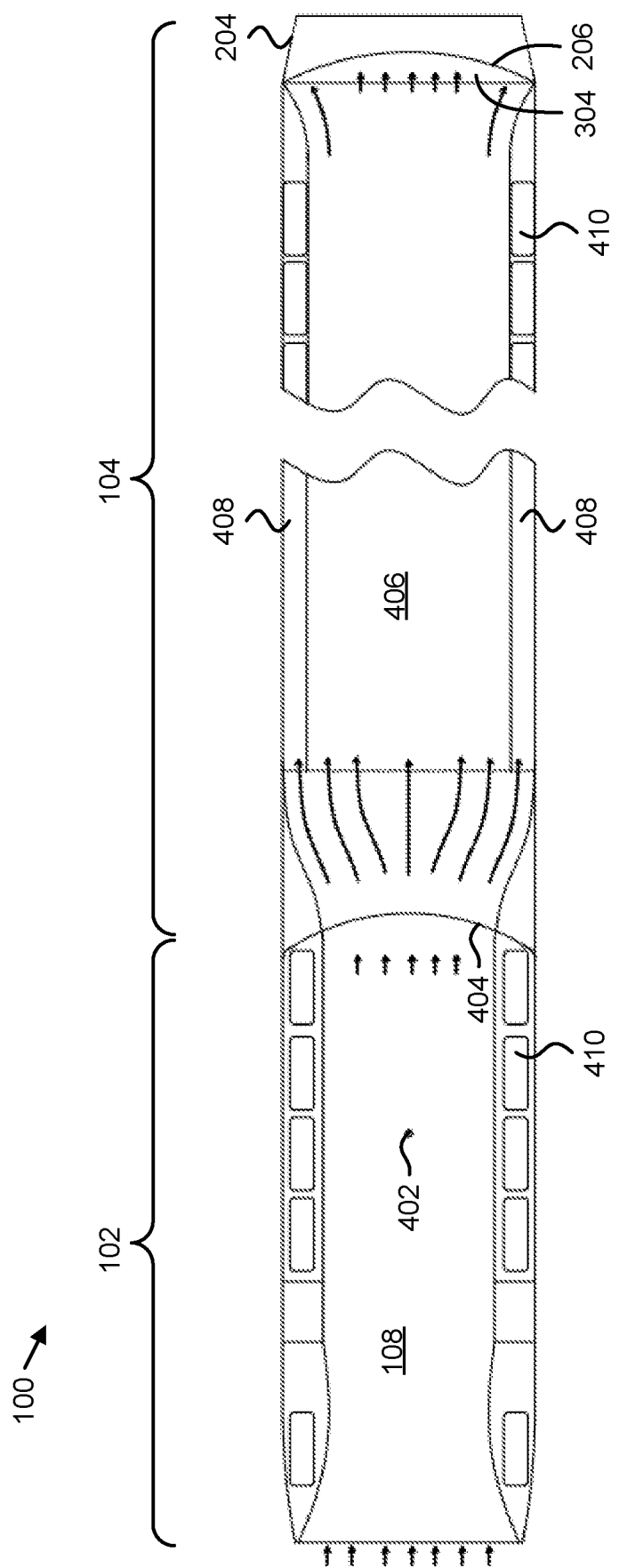
FIG. 4 is a plan view illustrating a further embodiment of a tractor-trailer.

FIG. 4 depicts one embodiment of a tractor-trailer 100, in a plan view. The tractor-trailer 100 of FIG. 4 may be substantially as described above with reference to FIGS. 1-3. In the depicted embodiment, the trailer 104 includes a duct system that receives airflow from the rear opening 112 of the tractor air duct 108 and directs the airflow to a location behind the cargo compartment 202 (e.g., the space 304 between the cargo compartment 202 and the air distributor 206). In the depicted embodiment, the duct system includes a lower trailer air duct 406, one or more auxiliary trailer air ducts (e.g., the auxiliary trailer air ducts 306 of FIG. 3), and one or more blind ducts 408.

The lower trailer air duct 406, in certain embodiments, is disposed underneath the cargo compartment 202, and positioned to receive airflow from the rear opening 112 of the tractor air duct 108. For example, a front opening of the lower trailer air duct 406 may be positioned adjacent or otherwise in communication with the rear opening 112 of the tractor air duct 108, so that air exiting the tractor air duct 108 enters the lower trailer air duct 406. In one embodiment, the lower trailer air duct 406 may be the largest or primary duct in a duct system for the trailer 104. In a further embodiment, the lower trailer air duct 406 may extend along the length of the trailer 104, underneath the cargo compartment 202, so that airflow enters the lower trailer air duct 406 at the front of the trailer 104, and so that at least a portion of the airflow exits the lower trailer air duct 406 at the back of the trailer 104. For example, a scoop 302 as described above may divert a portion of airflow from the lower trailer air duct 406 into the air distributor 206, and a further portion of airflow from the lower trailer air duct 406 may exit at the back of the trailer 104 without being directed through the air distributor 206. In some embodiments, the lower trailer air duct 406 may be a straight duct. In another embodiment, however, the lower trailer air duct 406 may widen toward the back of the trailer 104, decompressing the airflow that was compressed by the narrowing of the tractor air duct 108.

Auxiliary trailer air ducts 306, in various embodiments, may be any air ducts in addition to the lower trailer air duct 406, and may be disposed to one side of the cargo compartment 202, to the other side of the cargo compartment 202, to both sides, and/or to the top of the cargo compartment 202. For example, in various embodiments, a double-walled trailer 104 may have exterior and interior walls, so that a space between the walls forms one or more top or side auxiliary trailer air ducts 306. In certain embodiments, the auxiliary trailer air ducts 306 may be smaller than the lower trailer air duct 406. In further embodiment, the auxiliary trailer air ducts 306 may deliver airflow from the lower trailer air duct 406 and/or one or more blind ducts 408 to the air distributor 206. Compared to delivering air to the air distributor 206 solely from the lower trailer air duct 406 (e.g., via a scoop 302), delivering additional air to the air distributor 206 from ducts at the top and/or sides of the trailer 104, in certain embodiments, may increase the proportion of air that exits through the air distributor 206 to air that bypasses the air distributor 206, resulting in more even and less turbulent airflow behind the trailer 104. However, in certain embodiments, it may be difficult to divert airflow within the lower trailer air duct 406 into one or more auxiliary trailer air ducts 306.

Accordingly, in various embodiments, one or more blind ducts 408 may be disposed within the lower trailer air duct 406, and positioned to redirect a portion of airflow within the lower trailer air duct 406 to the one or more auxiliary trailer air ducts 306. In various embodiments, a blind duct 408 may be any duct with a front opening for receiving airflow, but with no rear opening (e.g., a "dead end"). In certain embodiments, a front opening of a blind duct 408 may be oriented toward the front of the lower trailer air duct 406 (e.g., facing the tractor 102) so that at least a portion of the airflow within the lower trailer air duct 406 enters the blind duct 408. In certain embodiments, directing airflow into blind ducts 408 may compress and/or redirect the air, as air entering the front of the blind ducts 408 is unable to leave via a rear opening. However, one or more side openings in the blind ducts 408 may communicate with the auxiliary trailer air ducts 306, so that airflow entering the blind ducts 408 is redirected, via the side openings, to the auxiliary trailer air ducts 306. In the depicted embodiment, the trailer 104 includes two blind ducts 408 on opposite sides of the lower trailer air duct 406, so that a side blind duct 408 directs airflow to a corresponding side auxiliary trailer air duct 306. In certain embodiments, a top auxiliary trailer air duct 306 may receive air from one or both side auxiliary trailer air ducts 306.

In one embodiment, a rear edge 404 of the tractor air duct 108 conforms to an arc with a radius extending to a pivot point 402 where the trailer 104 is coupled to the tractor 102. Pivotal movement of the tractor 102 relative to the trailer 104 may occur during turning, as the steering wheels redirect the tractor 102, and the trailer 104 follows. The pivot point 402 may be the location of a hitch pin for a fifth wheel coupling, or of a similar component for another type of coupling, where the tractor 102 pivots relative to the trailer 104. In certain embodiments, a gap may be provided between the tractor air duct 108 and the duct system of the trailer 104, to prevent ducts from interfering with the articulation of the tractor-trailer 100. However, air escaping through such a gap may increase turbulence at the sides of the tractor-trailer 100, and decrease the effectiveness of the trailer duct system. When the tractor-trailer 100 travels straight forward, air may tend not to escape through such a gap, because the airflow is directed toward the trailer duct system, not toward the gap. However, air may have a greater tendency to escape through a gap during turning or articulation of the tractor-trailer 100, due to the width of the gap increasing at the outside of the turn and due to at least a portion of the airflow being directed toward the gap. Accordingly, in certain embodiments, forming the rear edge 404 of the tractor air duct 108 with a constant (or substantially constant) radius from the pivot point 402 may prevent gaps between the tractor air duct 108 and the duct system of the trailer 104 (e.g., the lower trailer air duct 406) from becoming larger when the tractor-trailer 100 turns.

Additionally, in some embodiments, the rear edge 404 of the tractor air duct 108 and/or the front edge of the lower trailer air duct 406 may include an airtight coupling that prevents or substantially prevents air from escaping through a gap between ducts. (A coupling may be referred to herein as airtight even if some air is permitted to pass, if the coupling substantially prevents air from escaping.) An airtight coupling may include a rubber or plastic accordion-style coupling, a foam or brush strip that seals a gap, a coupling that inflates or expands to seal a gap, or the like. In one embodiment, an airtight coupling may be detachable, to facilitate decoupling of the tractor 102 from the trailer 104. In certain embodiments, an airtight coupling may be airtight at small articulation angles (e.g., less than 10 degrees, less than 5 degrees, or the like), but may allow air to pass at larger angles. Aerodynamic drag for a tractor-trailer 100 may be minor or insignificant at low speeds characteristic of sharp turns, but may be very significant at highway speeds, where small angles of articulation are more common (e.g., for lane changes or broad curves rather than for sharp turns). Accordingly, a small coupling such as a flexible, expandable, or inflatable strip may avoid turbulence by preventing air from escaping at small articulation angles or at highway speeds, even if the coupling allows air to pass at larger articulation angles.

In certain embodiments, wheels 410 of the tractor 102 and/or the trailer 104 may be in an in-line configuration. In various embodiments, "in-line" configurations of wheels 410 may include any configuration in which the wheels 410 for a side of the tractor 102 and/or the trailer 104 are in a line from front to back, rather than in pairs (e.g., in a "dual" configuration). However, wheels 410 in an in-line configuration may still be paired on opposite sides of the tractor 102 and/or the trailer 104. Thus, for example, a tractor 102 with rear wheels 410 in a dual configuration may include eight rear wheels 410 in two rows, but in the depicted embodiment, the tractor 102 includes eight rear wheels 410 in four rows, in an in-line configuration. In certain embodiments, providing wheels 410 in an in-line configuration for a tractor 102 may provide more horizontal room to accommodate a tractor air duct 108 than a tractor 102 with wheels 410 in a dual configuration. Similarly, in further embodiments, providing wheels 410 in an in-line configuration for a trailer 104 may provide more horizontal room to accommodate a lower trailer air duct 406 than a trailer 104 with wheels 410 in a dual configuration. Some trucks with in-line wheels may use non-standard or double-width wheels and tires, and therefore may not provide more horizontal room for an air duct than when the wheels are in a dual configuration. However, in some embodiments, wheels 410 in an in-line configuration may be standard single-width truck wheels and tires, so that the in-line configuration provides added horizontal room to accommodate air ducts 108, 406.

Figure 5:
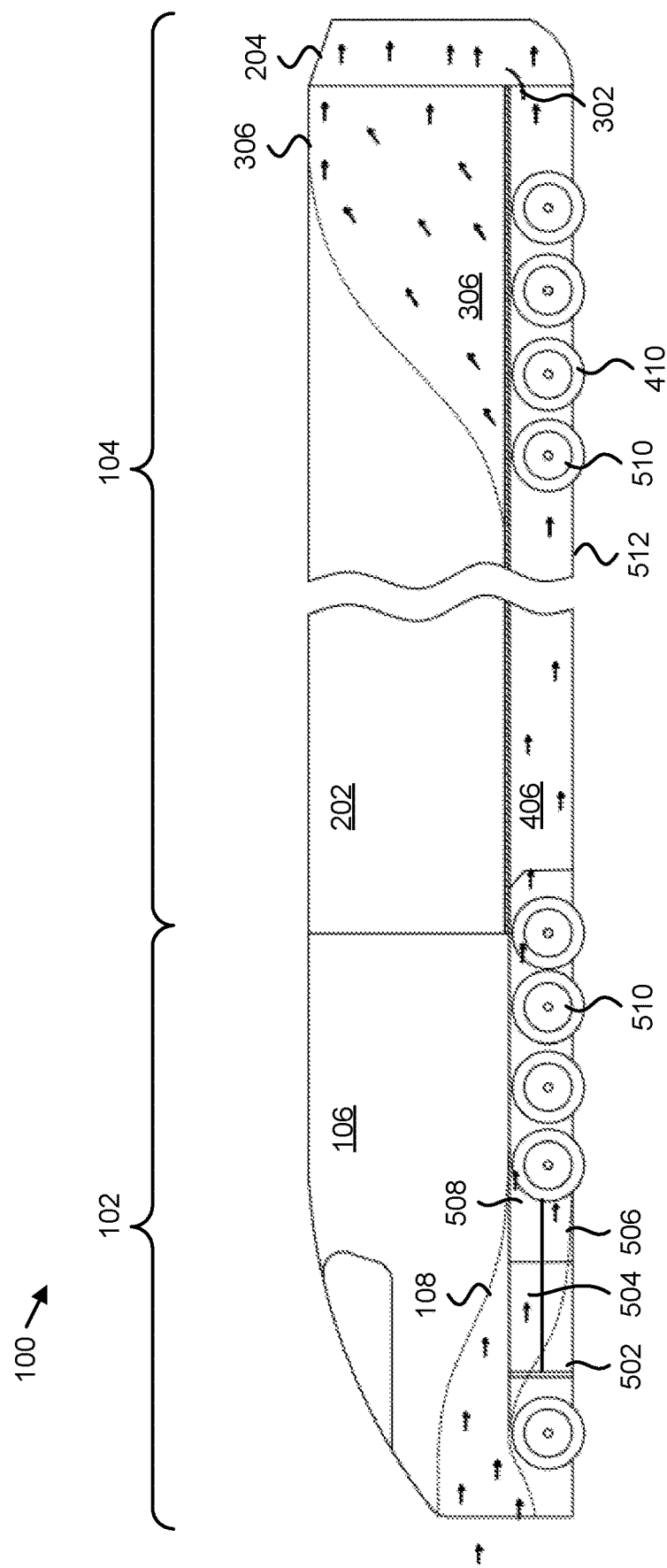
FIG. 5 is a side view illustrating a further embodiment of a tractor-trailer.

FIG. 5 depicts one embodiment of a tractor-trailer 100, in a side view. The tractor-trailer 100 of FIG. 5 may be substantially as described above with reference to FIGS. 1-4, including a tractor 102 with a tractor air duct 108 disposed under the cab 106, and a trailer 104 with a lower trailer air duct 406 disposed under the cargo compartment 202, and auxiliary trailer air ducts 306 at the sides and/or top of the cargo compartment 202. Additionally, in the depicted embodiment, the tractor-trailer 100 includes generators 502, energy storage 504, engines 506, co-generation units 508, and wheel hub motors 510, as described below.

The airflow described above with reference to FIGS. 1-4 is depicted by arrows. Air enters the tractor air duct 108, is compressed as the tractor air duct 108 narrows, and enters the lower trailer air duct 406. Blind ducts 408 (as depicted in FIG. 4) are not visible in FIG. 5, but direct at least a portion of the airflow in the lower trailer air duct 406 into the auxiliary trailer air ducts 306 at the sides and/or the top of the cargo compartment 202. The airflow from the auxiliary trailer air ducts 306 is distributed behind the trailer 104 by openings 208 in an air distributor 206 (as depicted in FIGS. 2-4), and directed by air directing blades 204. A scoop 302 directs a further portion of air from the lower trailer air duct 406 to be distributed by the openings 208 in the air distributor 206, and directed by the air directing blades 204. Remaining airflow of the lower trailer air duct 406 may exit the lower trailer air duct 406 at the rear of the trailer 104 but may bypass the air distributor 206.

In certain embodiments, the tractor air duct 108 and/or an air duct of the duct system for the trailer 104 may include a flexible lower surface and/or a retractable lower surface. For example, in the depicted embodiment, the lower surface 512 of the lower trailer air duct 406 may include flexible material, or may be retractable. In some embodiments, the lower surface 512 of the lower trailer air duct 406 or of the tractor air duct 108 may be below the axles or wheel hubs of the tractor-trailer 100, and may have a low clearance above the ground. In certain embodiments, a low-clearance air duct may provide ample space for airflow without reducing the volume of the cargo compartment 202. Highways may be designed to accommodate as little as five inches of ground clearance. However, a solid or immovable lower surface 512 with little ground clearance might be damaged by road features requiring higher ground clearance, such as dips or bumps. In some embodiments, a lower surface 512 of an air duct may be flexible. For example, a vinyl-coated fabric surface or other flexible material may be briefly displaced by bumps and dips, rather than being damaged. In another embodiment, a lower surface 512 of an air duct may be retractable. For example, in certain embodiments, hydraulic lifters, pneumatic lifters, electric motors, or the like may retract the lower surface 512 of an air duct when the tractor-trailer 100 is driven on bumpy or damaged roads. In a further embodiment, further surfaces of a duct may be flexible. For example, an entire duct may comprise flexible material, so that flexible sides allow movement or retraction of the lower surface 512.

In certain embodiments, the tractor 102 may include two engines 506 positioned on opposite sides of the tractor air duct 108. In some embodiments, a tractor air duct 108 may occupy space in front of the tractor 102 and under the cab 106, which would be occupied in a conventional tractor-trailer by powertrain components such as an engine, transmission, drive shaft, differential, drive axle shafts, and the like. However, in certain embodiments, space may be available under the cab 106 at either side of the tractor air duct 108 for powertrain components. In further embodiments, providing two engines 506 may efficiently utilize space at either side of the tractor air duct 108 instead of requiring a large additional space for a single large engine. In some embodiments, the total horsepower provided by both engines 506 may be less than the horsepower provided by a large engine in a conventional tractor-trailer. However, at highway speeds, most of the power produced by the engine of a conventional tractor-trailer may be expended overcoming aerodynamic drag. Conversely, a tractor-trailer 100 with air ducts as described herein may significantly reduce the proportion of power expended overcoming aerodynamic drag, and may therefore use smaller engines 506. Additionally, in certain embodiments either of the engines 506 may be used alone for driving that uses less power (e.g., when cruising on flat, smooth highways), and both engines 506 may be used together for driving that uses more power (e.g., when driving up hills or mountain passes).

In a certain embodiment, tractor 102 may include two generators 502 coupled to the two engines 506. In a further embodiment, one or more wheels 410 of the tractor 102 and/or the trailer 104 may include wheel hub motors 510 powered by the generators 502. The generators 502, in various embodiments, may include any type of electrical generator capable of being driven by an engine 506. In further embodiments, wheel hub motors 510 may be electric motors disposed in or directly coupled to wheels 410, so that a single wheel hub motor 510 drives a single wheel 410. In certain embodiments, an individual wheel hub motor 510 may have a small power output compared to an engine in a conventional tractor, but a plurality of wheel hub motors 510 in multiple wheels 410 of the tractor 102 and/or the trailer 104 may provide sufficient power for driving.

Additionally, in certain embodiments, wheel hub motors 510 may provide regenerative braking to generate electricity during deceleration of the tractor-trailer 100. In various embodiments, regenerative braking may use the wheel hub motors 510 as electric generators, so that energy of the moving tractor-trailer 100 is recovered as electricity rather than being dissipated as heat by friction brakes. In further embodiments, a tractor-trailer 100 may use the wheel hub motors 510 for regenerative braking, and may use friction brakes (e.g., drum brakes, disc brakes, or the like) to provide additional braking (e.g., for more rapid deceleration).

In certain embodiments, the tractor 102 and/or the trailer 104 may include energy storage 504, such as ultracapacitors and/or storage batteries. In one embodiment, ultracapacitors and/or storage batteries may be coupled to the generators 502 to store electricity produced by the generators 502. In further embodiments, storage 504 such as ultracapacitors and/or storage batteries may store energy generated by the generators 502, by co-generation units 508, and/or by the wheel hub motors 510 during regenerative braking. In certain embodiments, electrical energy storage 504 may charge when more electrical energy is produced than the tractor-trailer 100 uses, and may discharge to supply electricity when less electrical energy is produced than the tractor-trailer 100 uses. In various embodiments, using storage 504 to accumulate and release electrical energy may allow a control component to run the engines 506 at power levels selected based on engine efficiency instead of based on the instantaneous power needs of the tractor-trailer 100.

In the depicted embodiment, the storage 504 accumulates and releases energy during operation of the tractor-trailer 100. In another embodiment, an electric tractor 102 may include additional storage 504 instead of engines 506, generators 502, and/or co-generation units 508, and the storage 504 may charge when connected to an external power supply, and may discharge during operation of the tractor-trailer 100. In either case, an electric drive system with motors 510 disposed in wheel hubs may accommodate the tractor air duct 108 and the lower trailer air duct 406 by avoiding running a drive shaft and/or drive axles through the space used by the ducts. For example, in some embodiments, wheels 410 may be coupled to wheel hub motors 510, and non-rotating parts of the wheel hub motors 510 or wheel hubs (e.g., stators comprising one or more field coils or permanent magnets) may in turn be coupled directly to frame components, such as rails running along the sides of the tractor air duct 108 or the lower trailer air duct 406.

In some embodiments, the tractor 102 may comprise co-generation units 508 coupled to the two engines 506. In certain embodiments, co-generation units 508 may generate electricity using waste heat from the engines 506. Co-generation units 508, in various embodiments, may include any component or set of components capable of using heat to produce electricity. For example, in one embodiment, a co-generation unit 508 may include a turbine driven by a heated working fluid, and a generator driven by the turbine. In certain embodiments, waste heat from the engines 506 may be recovered from engine coolant and/or from engine exhaust. For example, in one embodiment, engine coolant may be the working fluid for a co-generation turbine, and a coolant pump may circulate coolant from an engine 506 through a co-generation turbine before dissipating remaining heat via a radiator. In a further embodiment, one or more heat exchangers thermally coupled to the engine exhaust (e.g., disposed on an exhaust manifold, an exhaust pipe, or the like) may transfer heat from the engine exhaust to the working fluid. In further embodiments, the engines 506 may be insulated or jacketed to facilitate transfer of waste heat to the engine coolant or working fluid for the co-generation units 508.

In certain embodiments, a co-generation unit 508 may use a water-ammonia mixture as the working fluid to turn a turbine. Waste heat from the engines 506 may superheat the water-ammonia mixture. Ammonia in the superheated working fluid may flash to a gas, and expansion of the gaseous ammonia may drive a turbine. The remaining liquid water may be circulated through the turbine casing and/or stationary blades. As the ammonia expands and cools, driving the turbine, heat from the circulating liquid water may be exchanged with the gaseous ammonia, providing further expansion.

Figure 6:
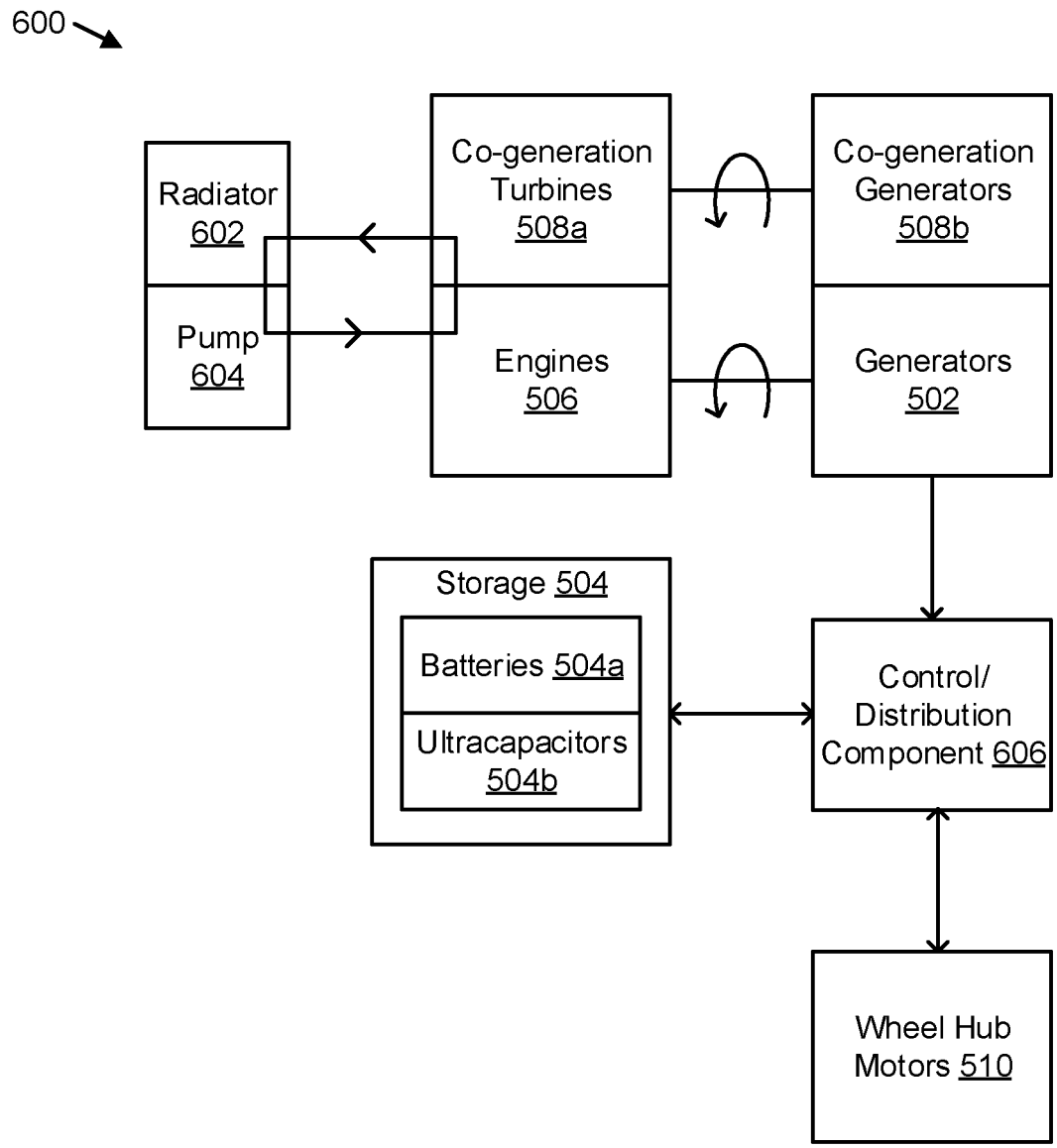
FIG. 6 is a schematic block diagram illustrating one embodiment of a power system for a tractor-trailer.

FIG. 6 depicts one embodiment of a power system 600 for a tractor-trailer 100. In the depicted embodiment, the power system 600 includes engines 506, generators 502, co-generation units 508, storage 504, and wheel hub motors 510, which may be substantially as described above. In the depicted embodiment, the co-generation units 508 include co-generation turbines 508a and co-generation generators 508b, and the storage 504 includes batteries 504a and ultracapacitors 504b, which may be substantially as describe above. Additionally, in the depicted embodiment, the power system 600 includes a radiator 602, a pump 604, and a control/distribution component 606.

A pump 604, in one embodiment may circulate a fluid that acts as a coolant for an engine 506 and as a working fluid for a co-generation turbine 508a. The fluid may be heated as it circulates through the engine 506, and/or through heat exchangers coupled to the exhaust of the engine 506, and may expand and cool as it drives the co-generation turbine 508a. Remaining heat in the fluid may be dissipated via a radiator 602, and the cooled fluid may be recirculated. The engines 506 drive generators 502, and the co-generation turbines 508a drive co-generation generators 508b, producing electricity that is received by the control/distribution component 606.

In various embodiments, the control/distribution component 606 distributes electrical power. In certain embodiments, the control/distribution component 606 may include relays, power transistors, or similar switching components for switching and/or distributing electricity, and may include logic hardware, a processor controlled by computer-readable code stored on a non-transitory medium, or the like, to control the switching components.

In one embodiment, the control/distribution component 606 controls the amount of power sent to wheel hub motors 510 based on factors such as driver input (e.g., via an accelerator pedal), traction control sensors, and the like. When the amount of power used by the wheel hub motors 510 is greater than the amount of power produced by the generators 502 and the co-generation generators 508b, the control/distribution component 606 may discharge the electrical energy storage 504 to drive the wheel hub motors 510. When the amount of power used by the wheel hub motors 510 is less than the amount of power produced by the generators 502 and the co-generation generators 508b, the control/distribution component 606 may charge the electrical energy storage 504. In a further embodiment, the control/distribution component 606 may independently control charging or discharging rates for batteries 504a and for ultracapacitors 504b. Similarly, during regenerative braking, the control/distribution component 606 may distribute electricity generated by the wheel hub motors 510 to the batteries 504a and/or the ultracapacitors 504b.

In certain embodiments, the control/distribution component 606 may control the amount of power produced. For example, if the wheel hub motors 510 are generating power, or using a small amount of power, and if the storage 504 is fully charged, or nearly fully charged, the control/distribution component 606 may run the engines 506 at slower speeds, turn off one or more of the engines 506, or the like. Conversely, if the wheel hub motors 510 are using a large amount of power, and if the storage 504 is discharged, or nearly discharged, the control/distribution component 606 may run the engines 506 faster. Various further ways of using a control/distribution component 606 to manage power generation and distribution will be clear in view of this disclosure.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A tractor-trailer comprising:
a tractor comprising a tractor air duct disposed underneath a cab, the tractor air duct extending between a front opening at a front of the tractor and a rear opening at a rear of the tractor; and
a trailer comprising:
a duct system that receives airflow from the rear opening of the tractor air duct and directs the airflow to a location behind a cargo compartment; and
an air distributor disposed behind the cargo compartment, the air distributor comprising a fairing with openings, the fairing coupled to the duct system of the trailer such that airflow from the duct system enters a space between the cargo compartment and the fairing, and exits the openings behind the trailer.

2. The tractor-trailer of claim 1, wherein the duct system comprises:
a lower trailer air duct disposed underneath the cargo compartment, the lower trailer air duct positioned to receive airflow from the rear opening of the tractor air duct;
one or more auxiliary trailer air ducts disposed at one or more of a first side of the cargo compartment, a second side of the cargo compartment, and a top of the cargo compartment; and
one or more blind ducts disposed within the lower trailer air duct, wherein the one or more blind ducts are positioned to redirect a portion of airflow within the lower trailer air duct to the one or more auxiliary trailer air ducts.

3. The tractor-trailer of claim 1, wherein the openings of the fairing comprise a set of vertical openings disposed across a back of the fairing.

4. The tractor-trailer of claim 1, wherein a rear edge of the tractor air duct conforms to an arc with a radius extending to a pivot point where the trailer is coupled to the tractor.

5. The tractor-trailer of claim 1, wherein the front opening of the tractor air duct is larger than the rear opening of the tractor air duct.

6. The tractor-trailer of claim 1, wherein an internal surface of one or more of the tractor air duct and the duct system is dimpled.

7. The tractor-trailer of claim 1, wherein an external surface of one or more of the tractor and the trailer is dimpled.

8. The tractor-trailer of claim 1, wherein the air distributor is movable to access rear doors of the cargo compartment.

9. The tractor-trailer of claim 1, wherein the trailer further comprises one or more air directing blades disposed at the rear of the cargo compartment.

10. The tractor-trailer of claim 1, wherein an air duct of the duct system comprises one or more of a flexible lower surface and a retractable lower surface.

11. The tractor-trailer of claim 1, wherein wheels of the tractor and the trailer are in an in-line configuration.

12. The tractor-trailer of claim 1, wherein the tractor further comprises two engines positioned on opposite sides of the tractor air duct.

13. The tractor-trailer of claim 12, wherein the tractor further comprises:
generators coupled to the two engines, wherein wheels of one or more of the tractor and the trailer comprise wheel hub motors powered by the generators; and
co-generation units coupled to the two engines that generate electricity using waste heat from the engines.

14. The tractor-trailer of claim 13 wherein the tractor further comprises ultracapacitors and storage batteries coupled to the generators and/or wherein the wheel hub motors provide regenerative braking to generate electricity during deceleration.

15. An apparatus comprising:
an air distributor comprising a fairing with openings, wherein:
the fairing is shaped to form a space between a cargo compartment of a trailer and the fairing when the fairing is coupled to the trailer behind the cargo compartment; and
the openings are shaped to permit airflow entering the space from a duct system in the trailer to exit the openings behind the trailer, wherein the fairing is coupled to the duct system of the trailer.

16. The apparatus of claim 15, wherein the openings of the fairing comprise a set of vertical openings disposed across a back of the fairing, and wherein the air distributor is movable to access rear doors of the cargo compartment.

17. The apparatus of claim 15, further comprising:
a tractor comprising a tractor air duct disposed underneath a cab, the tractor air duct extending between a front opening at a front of the tractor and a rear opening at a rear of the tractor; and
the trailer comprising the duct system, wherein the duct system receives airflow from the rear opening of the tractor air duct and directs the airflow to the space between the cargo compartment and the fairing, the duct system comprising:
a lower trailer air duct disposed underneath the cargo compartment, the lower trailer air duct positioned to receive airflow from the rear opening of the tractor air duct;
one or more auxiliary trailer air ducts disposed at one or more of a first side of the cargo compartment, a second side of the cargo compartment, and a top of the cargo compartment; and
one or more blind ducts disposed within the lower trailer air duct, wherein the one or more blind ducts are positioned to redirect a portion of airflow within the lower trailer air duct to the one or more auxiliary trailer air ducts.

18. An apparatus comprising:
a trailer comprising a duct system for receiving airflow from in front of the trailer and directing the airflow to a location behind a cargo compartment of the trailer, the duct system comprising:
a lower trailer air duct disposed underneath the cargo compartment, the lower trailer air duct positioned to receive the airflow;
one or more auxiliary trailer air ducts disposed at one or more of a first side of the cargo compartment, a second side of the cargo compartment, and a top of the cargo compartment; and
one or more blind ducts disposed within the lower trailer air duct, wherein the one or more blind ducts are positioned to redirect a portion of airflow within the lower trailer air duct to the one or more auxiliary trailer air ducts.

19. The apparatus of claim 18, further comprising:
a tractor comprising a tractor air duct disposed underneath a cab, the tractor air duct extending between a front opening at a front of the tractor and a rear opening at a rear of the tractor, wherein the duct system of the trailer receives airflow from the rear opening of the tractor air duct; and an air distributor disposed behind the cargo compartment of the trailer, the air distributor comprising a fairing with openings, such that airflow from the duct system enters a space between the cargo compartment and the fairing, and exits the openings behind the trailer.

20. The tractor-trailer of claim 4, wherein the rear edge of the tractor air duct conforming to an arc with a radius comprises one or more of:

an accordion-style coupling between the tractor air duct and the trailer air duct;

foam and/or brush strip that seals a gap between the tractor air duct and the trailer air duct; and/or a coupling that inflates and/or expands to seal a gap between the tractor air duct and the trailer air duct.

* * * * *